2,955,051

TREATMENT OF CLAYS AND CLAY PRODUCTS PRODUCED THEREBY

William T. Maloney, Dwight Ave., Clinton, N.Y.; Mabel O. Maloney, executrix of said William T. Maloney, deceased No Drawing. Filed Aug. 27, 1956, Ser. No. 606,197

12 Claims. (Cl. 106—292)

This invention relates to the treatment of clays to improve their brightness and color and also to improve their other finish-imparting properties when used in coatings for paper.

In the processing or refining of naturally-occurring clays of the china clay or koalin types to produce products useful in color compositions for coating paper it is customary to subject the clay as mined to a preliminary washing to separate out mica and other coarse impurities followed by an appropriate fractionating treatment designed to separate the clay into a relatively fine fraction and a coarser fraction or fractions. The finer fraction is used as a mineral component in the coating of paper. The coarser fraction or fractions are customarily used as a filler for papers of various kinds, being added to the pulp at the beaters preliminary to the forming of the paper web.

Clays which in their naturally-occurring state carry more or less of color impurities must be refined to improve their color. This is especially true of certain of the American clays such as those found in North Carolina, South Carolina, Georgia and Alabama. Accordingly, when using such clays as the source of the finer fraction that is to be used in coating paper, it is necessary to subject the clay to a bleaching treatment. As this treatment is usually conducted, the clay in the form of the finer fraction resulting from a previous refining and fractionating treatment is suspended in water to form a dilute suspension, usually of a proportion of about 20% clay, and mixed with a suitable bleaching agent adapted to act upon the color impurities and convert them into compounds that are colorless, i.e., white, or which can be washed away from the clay in a subsequent washing treatment. Among the bleaching agents that have been employed are the soluble salts of various reducing acids, notably sulfurous acid, with or without addition of a salt of a metal that forms uncolored oxidized salts, such as zinc. After the clay is thoroughly mixed with the bleaching agent and the impurities have become reduced or otherwise acted upon, the treated clay is further washed and filtered to separate out the water-soluble impurities.

The washing of the treated clay following the bleaching treatment is a tedious operation requiring large quantities of water and the filtering operation is slow due to the highly dispersed state of the clay. Difficulties also arise because of the tendency for reversion to colored compounds of certain of the impurities due to the prolonged filtering and washing treatment that is involved.

The present invention has for an object to provide an improved process of bleaching and treating clays which brings about very substantial savings in time, labor and other production costs involved in the recovery of the bleached clay from its dilute suspension in water required for the bleaching step.

It is a further and important object of the invention to provide a process wherein the clay is not only bleached to improve its brightness but is also greatly improved in its finish-imparting properties when used in color compositions for coating paper.

It is a further object of the invention to provide a novel bleached and treated clay product useful in coating paper and for other purposes.

Other objects and advantages of the invention will be made apparent from the following more detailed description.

The present invention is based in part on my discovery that the customary bleaching operation can be improved and simplified by subjecting the clay suspension at the conclusion of the bleaching treatment and prior to filtering to a flocculating treatment with one of the alkaline earth hydroxides, preferably calcium hydroxide, sufficient of the hydroxide being added to bring the pH of the suspension at least to the neutral point and preferably slightly on the alkaline side. This treatment is then followed by filtering to effect at least a partial dewatering of the clay. The treated clay may be then immediately used in forming a coating composition or dried to facilitate subsequent handling in storage or for shipment to the paper manufacturer.

Although I am not at this time able to explain fully why this is so, I have found that the use of zinc hydrosulfite as the bleaching agent appears to be essential if a substantial improvement in the finish-imparting properties is to be realized along with satisfactory bleaching and improved filtering properties. Zinc hydrosulfite may be added as such or formed in situ in the clay suspension by adding metallic zinc and sulfurous acid.

These modifications of the prior practice bring about several novel and unexpected results:

(1) When zinc hydrosulfite is used as the bleaching agent and the treatment with the alkaline earth hydroxide is applied immediately after the bleaching action is completed, there is no evidence of any tendency toward reversion to color, and this freedom from tendency to reversion persists throughout the subsequent handling of the clay and during its use in forming coatings on paper.

(2) The filtering of the clay is simplified and washing of the clay on the filters may be and preferably is omitted.

(3) A third and very surprising result of this treatment is the improvement in the gloss and overall finish characteristics of paper coated with a color suspension containing the clay product resulting from this treatment.

The improvement in gloss values obtainable with the use of my process is indeed remarkable, and from the economic standpoint means that clays that have heretofore not been considered as suitable as paper coating clays, except where relatively low-grade finishes would suffice, may be used to obtain results fairly comparable with those heretofore obtainable only by the use of very carefully refined and selected finer clay fractions which sell for several times the cost of the filler and other relatively low grade clays used in the paper industry.

Example 1

As illustrative of the general process embodying my invention, an air-floated clay sold commercially for use as a filler or a low grade coating clay was treated according to my process. This clay consisted of a fraction 99.5% of the particles of which passed a 325 mesh sieve, with the particle sizes running from a diameter of about 43 microns down. This clay represents a refined intermediate fraction of a naturally-occurring clay mined near Dry Branch, Georgia, and known to the trade as Georgia Kaolin No. 7. An aqueous suspension or slip containing 40 parts of clay to 60 parts of water was prepared. The clay was in a dispersed state and the resulting suspension was on the acid side at the start of the bleaching step. As the bleaching agent, zinc hydrosulfite was added to the clay slip in the proportion of 8 lbs. per ton of clay and the slip was vigorously stirred for fifteen minutes to insure uniform distribution. Milk of lime was then added with stirring until the pH of the slip had been brought to about 7.8. In this particular case the addition of 3 lbs. of calcium hydroxide per ton of clay, in the form of a milk of lime suspension, was sufficient to effect the desired conversion of the suspension from the acid side to the pH value stated. After the neutralizing step was complete the slip was fed directly to filters. The clay treated in this manner and without any preliminary settling filters very readily, and in this respect the contrast with the prior experience in the filtering of bleached clays is very striking. The clay may be washed in the filters or re-suspended in water and re-filtered to complete the separation of any soluble impurities.

The moist filter cake resulting from the above operations may be used directly in forming a color suspension for coating, or if desired the filter cake may be first dried and then later re-suspended to form a color composition. It is advisable to dry the clay immediately unless it is intended to use it within a few days or at most within a week's time. In case it is intended to be used in such a short time it may be allowed to remain in the form of the filter cake which usually contains about 65–70% solids.

A color composition was made up by re-suspending a dried portion of the bleached and treated clay product in water and adding, for each 100 lbs. of clay, 12½ lbs. of casein previously mixed with 1 lb. of liquid ammonia. After thoroughly mixing, the color composition was applied to a suitable book paper stock in a proportion sufficient to provide a 7# coating (dry basis). In the above test a 20# book paper stock was used. After calendering by passing four times between the rolls of a laboratory calendering machine and then drying, the coated paper showed a glossmeter reading of 70.5 when measured with a Bausch & Lomb Glossmeter.

Another sample of the bleached and treated clay product, exactly the same except that the product was taken directly from the wet filter cake and without drying was made into a similar color composition and applied to the same kind of paper stock. The weight of coating and calendering treatment were likewise the same. In this case a glossmeter reading of 73.5 was obtained. In both of the above tests the proportion of casein was selected so as to insure that the resulting coated paper would respond to a wax test of 5 and a wax test of 5 was obtained in each case.

The proportion of ammonia added to solubilize the casein may be varied considerably as in the prior practice of forming coating compositions in which casein is present as a binder for the clay particles. Usually best results are obtained when the proportion of ammonia is such as to bring the pH of the coating composition to a value of at least 8, and an alkalinity of at least pH 9 is preferred. It will be understood that less ammonia is required in forming the coating composition when the alkalinity of the clay slip has been brought further to the alkaline side during the treatment of the clay, and vice versa when the amount of alkaline earth hydroxide added in the neutralizing stage is such as to bring the pH only to the neutral point or slightly to the alkaline side more ammonia will need to be added in forming the coating composition. However, in producing treated clay according to my invention for sale to paper manufacturers the pH is preferably brought back below 7.5 by the addition of alum $[Al_2(SO_4)_3 \cdot xH_2O]$ before the filtering step. This is done in order to render the clay readily dispersible when it is to be used in a coating composition with starch as the binder. This is not necessary when casein is used as the binder since it acts as a dispersing agent. However, even when the clay is to be used with casein it is preferable that the pH be only slightly on the alkaline side when the clay is to be dried and shipped to the customer. If it is treated directly at the paper mill and is not dried before being made up into a color composition with casein, it may be left with the pH much higher on the alkaline side.

*Example 2*

A sample of the same air-floated clay in the untreated state was used in making up a color composition which in other respects was similarly proportioned as to the color constituents and water. The coating weight and calendering conditions were the same. This sample gave a glossmeter reading of only 38.5.

*Example 3*

A slip was made up containing 40% by weight of the aforementioned Georgia Kaolin No. 7 air floated clay. Zinc hydrosulfite in the proportion of 8 lbs. per ton of clay was added to the clay slip and the slip was then stirred for fifteen minutes. It was then neutralized by addition of barium hydroxide to a pH of 7 whereupon the suspension was filtered and the clay product was dried. Thereafter a color composition was prepared by forming a 40% solids suspension in water of the treated clay product and then adding thereto an aqueous solution of casein previously mixed with liquid ammonia (12½% casein and 1% ammonia based on the weight of the clay). Brush out samples were made by applying this composition to 20# book paper stock in amount sufficient to produce an 18 lb. coating. The coated sheet, after calendering (four nips), gave a B & L glossmeter reading of 70.5.

*Example 4*

A similar test as described under Example 3 above except that strontium hydroxide was used to neutralize the slip and a No. 4 R.D.S. laboratory coating rod was used in applying the coating to the book paper stock. In this case an 8 lb. coating was obtained. The coated sheet after calendering as before gave a B & L glossmeter reading of 51.0.

In all of the above coating tests casein was used as the binder. Similar results may be used when using starch. When starch is used as the binder in paper coating compositions it is the usual practice to disperse the clay in an aqueous suspension before adding the starch. A dispersing agent such as trisodium phosphate or sodium silicate or mixtures of these agents is customarily employed. This practice should be followed in forming a color composition with my treated clay product when using starch as a binder. After the clay has been dispersed and the suspension allowed to stand for a suitable interval the starch may be added. Ordinarily the color composition will be easier to handle if the clay has been neutralized or brought slightly to the acid side before the addition of the starch. However, in using my clay product it is important to acidify with alum or a similar acid salt rather than with an acid since in this way any tendency to throw zinc ions back into the solution is avoided. This is particularly important when the color composition is being made up with the use of dry starch that is to be broken down by the action of steam and a suitable enzyme in the color composition after the color mixture has been formed. Otherwise, the adverse action of the zinc ions on the enzyme will interfere with the desired degradation of the starch.

It appears that the improvement in result is not specific to the particular type of china clay that is treated. Similar improvements in result are indicated when the process is applied to clays derived from the mines located near McIntire, Georgia and also the mine located at Dry Branch, Georgia. Satisfactory improvement has also been obtained with clay obtained from Alabama.

It will be understood that the proportion of the bleaching agent will be adjusted to insure that sufficient of such agent s added to react with all of the reducible color impurities. These, of course, vary depending upon the type of clay being treated. For example, entirely satisfactory results, and in some cases even better results, have been obtained with air floated clays of the type used in the tests above described when the proportion of zinc hydrosulfite has been reduced to 6 lbs. per ton of clay.

It also appears to be a significant factor in the process that the neutralization of the bleached clay suspension not only facilitates the filtering and also appears to soften or in some other way beneficially modify the clay, but in addition seems to act to stabilize the resulting clay product so that there is no tendency for reversion to the original color. Therefore, even though certain of the original color impurities have only been converted into colorless or white substances and remain in the clay product, this does not undesirably affect the clay product. Their presence does not give rise to any tendency for reversion of the color with resultant impairment of the brightness and finish provided the clay is not exposed to oxidizing influences while in the form of aqueous suspensions that are on the acid side as distinguished from the neutral and alkaline states.

The surprising improvement in the finish-imparting properties of the clay products of my invention as compared with the finish-imparting properties of the same clays when merely bleached in the conventional way is believed at least in part attributable to the fact that the product resulting from the disclosed process treatment contains insoluble colorless (white) compounds of zinc and calcium or another of the alkaline earth metals disclosed. These compounds are apparently adsorbed on to the clay particles perhaps in the form of a complex which may include the ferrous compounds that are also present.

The clay products of my invention show highly satisfactory viscosity characteristics when used in color composition provided the pH is kept close to neutrality or brought slightly on the acid side in the manner hereinbefore disclosed. This is a factor of considerable practical importance because paper mills prefer to operate with color compositions of relatively high solids content since in this way it is possible to coat at higher speeds and the drying costs are reduced.

This application is a continuation-in-part of my copending application Serial No. 281,257, filed April 8, 1952, now abandoned.

I claim:

1. The process of treating clay to improve the color and finish-imparting properties thereof when used in coating paper which comprises adding zinc hydrosulfite to an aqueous suspension of clay in a proportion sufficient to bleach reducible color impurities therein and stirring until mixing is complete, then without any intermediate washing adding an alkaline earth hydroxide to the suspension in a proportion sufficient to bring the pH of the suspension to a value between 7 and 7.8, and thereafter at least partially dewatering the resultant product.

2. The improvement in the treatment of kaolin clay containing color impurities to improve the color and finish-imparting properties thereof which comprises adding zinc hydrosulfite to an aqueous suspension of the clay in a proportion sufficient to bleach reducible color impurities therein and thereafter and before any substantial reversion of such impurities has occurred and without any intermediate washing, adding an alkaline earth hydroxide to the suspension in a proportion sufficient to bring the pH of the suspension to a value between 7 and 7.8, and thereafter at least partially dewatering the resultant product.

3. The process according to claim 2 wherein the kaolin clay is a degritted intermediate fraction 99.5% of the particles of which will pass a 325 mesh sieve.

4. The improvement in the treatment of clay containing color impurities to improve the color and finish-imparting properties thereof when used in coating paper which comprises the steps of adding zinc hydrosulfite to an aqueous suspension of clay in a proportion sufficient to bleach reducible color impurities therein, and thereafter and before any substantial reversion of said impurities has occurred and without any intermediate washing, adding an alkaline earth hydroxide to the suspension in a proportion sufficient to bring the pH of the suspension to a value between 7 and 7.8, and then filtering and recovering the bleached clay product in association with the substantially water insoluble reaction products of the neutralizing step.

5. The improvement in the treatment of kaolin clay containing color impurities to improve the color and finish-imparting properties thereof which comprises adding zinc hydrosulfite to an aqueous suspension of the clay in a proportion sufficient to bleach reducible color impurities therein and thereafter and before any substantial reversion of such impurities has occurred and without any intermediate washing, adding an alkaline earth hydroxide to the suspension in a proportion sufficient to bring the pH of the suspension to a value between 7 and 7.8, then adding aluminum sulphate to lower the pH value of the suspension to below 7, and thereafter at least partially dewatering the resultant product.

6. The process of treating clay to improve the color and finish-imparting properties thereof when used in coating paper which comprises adding zinc hydrosulfite to an aqueous suspension of clay in a proportion sufficient to bleach reducible color impurities therein and stirring until mixing is complete, then without any intermediate washing, adding calcium hydroxide to the suspension in a proportion sufficient to bring the pH of the suspension to a value between 7 and 7.8, and thereafter at least partially dewatering the resultant product.

7. The improvement in the treatment of kaolin clay containing color impurities to improve the color and finish-imparting properties thereof which comprises adding zinc hydrosulfite to an aqueous suspension of the clay in a proportion sufficient to bleach reducible color impurities therein and thereafter and before any substantial reversion of such impurities has occurred and without any intermediate washing, adding calcium hydroxide to the suspension in a proportion sufficient to bring the pH of the suspension to a value in the range 7 to 7.8, and thereafter dewatering the resultant product.

8. The process of treating clay to improve the color and finish-imparting properties thereof when used in coating paper which comprises adding zinc hydrosulfite to an aqueous suspension of clay in a proportion sufficient to bleach reducible color impurities therein and stirring until mixing is complete, then without any intermediate washing, adding barium hydroxide to the suspension in a proportion sufficient to bring the pH of the suspension to a value between 7 and 7.8, and thereafter at least partially dewatering the resultant product.

9. The improvement in the treatment of kaolin clay containing color impurities to improve the color and finish-imparting properties thereof which comprises adding zinc hydrosulfite to an aqueous suspension of the clay in a proportion sufficient to bleach reducible color impurities therein and thereafter and before any substantial reversion of such impurities has occurred and without any intermediate washing, adding barium hydroxide to the suspension in a proportion sufficient to bring the pH of the suspension to a value in the range 7 to 7.8, and thereafter dewatering the resultant product.

10. The process of treating clay to improve the color and finish-imparting properties thereof when used in coating paper which comprises adding zinc hydrosulfite to an aqueous suspension of clay in a proportion sufficient to bleach reducible color impurities therein and stirring until mixing is complete, then without any intermediate washing, adding strontium hydroxide to the suspension in a proportion sufficient to bring the pH of the suspension to a value between 7 and 7.8, and thereafter at least partially dewatering the resultant product.

11. The improvement in the treatment of kaolin clay containing color impurities to improve the color and finish-imparting properties thereof which comprises adding zinc hydrosulfite to an aqueous suspension of the clay in a proportion sufficient to bleach reducible color impurities therein and thereafter and before any substantial reversion of such impurities has occurred and without any intermediate washing, adding strontium hydroxide to the suspension in a proportion sufficient to bring the pH of the suspension to a value in the range 7 to 7.8, and thereafter dewatering the resultant product.

12. A product of manufacture adapted for use in color compositions for coating paper consisting essentially of finely divided clay particles which have been subjected to a bleaching treatment with zinc hydrosulfite and thereafter without intermediate washing neutralized with an alkaline earth hydroxide to a pH range of 7 to 7.8.

References Cited in the file of this patent

UNITED STATES PATENTS

| | | |
|---|---|---|
| 2,251,256 | Feldenheimer | July 29, 1941 |
| 2,339,595 | Williams et al. | Jan. 18, 1944 |

FOREIGN PATENTS

| | | |
|---|---|---|
| 466,429 | Great Britain | May 28, 1937 |